United States Patent [19]

Zaccariotto

[11] 4,316,633

[45] Feb. 23, 1982

[54] CONVERTIBLE AUTOMOBILE SEAT STRUCTURE PROVIDED WITH A SAFETY BELT HOOKING DEVICE

[75] Inventor: Moïse Zaccariotto, Paris, France

[73] Assignees: Automobiles Peugeot; Societe Anonyme Automobiles Citroen, both of Paris, France

[21] Appl. No.: 121,884

[22] Filed: Feb. 15, 1980

[30] Foreign Application Priority Data

Feb. 22, 1979 [FR] France .................................. 79 04525

[51] Int. Cl.³ .............................................. B60N 1/02
[52] U.S. Cl. .................................. 297/331; 297/379; 297/468
[58] Field of Search ............... 297/331, 344, 325, 326, 297/379, 468, 483; 296/65 R, 65 A, 66

[56] References Cited

U.S. PATENT DOCUMENTS

| | | | |
|---|---|---|---|
| 2,586,012 | 2/1952 | Dorton | 297/326 |
| 3,262,725 | 7/1966 | Ballantyne | 297/379 |
| 3,322,458 | 5/1967 | Bachmann | 296/65 R |
| 3,410,600 | 11/1968 | Thorpe | 297/379 |
| 3,457,719 | 6/1969 | DeLorean | 297/468 |

Primary Examiner—Francis K. Zugel
Attorney, Agent, or Firm—Burns, Doane, Swecker & Mathis

[57] ABSTRACT

The seat structure comprises a seat mounted in the vicinity of the front part thereof to pivot about a transverse axis. A hook device for safety belts is fixed to the seat and means for connecting the hooking device to the floor of the vehicle are provided. The connecting means comprise a latch carried by the hooking device, a keeper pivotally mounted on the floor and driven by the latch to a position of engagement with the latch under the effect of a vertical load applied on the seat in opposition to the action of a release spring. A bolt is provided for locking the keeper in the position of engagement with the latch and manual means are provided for releasing the bolt.

5 Claims, 8 Drawing Figures

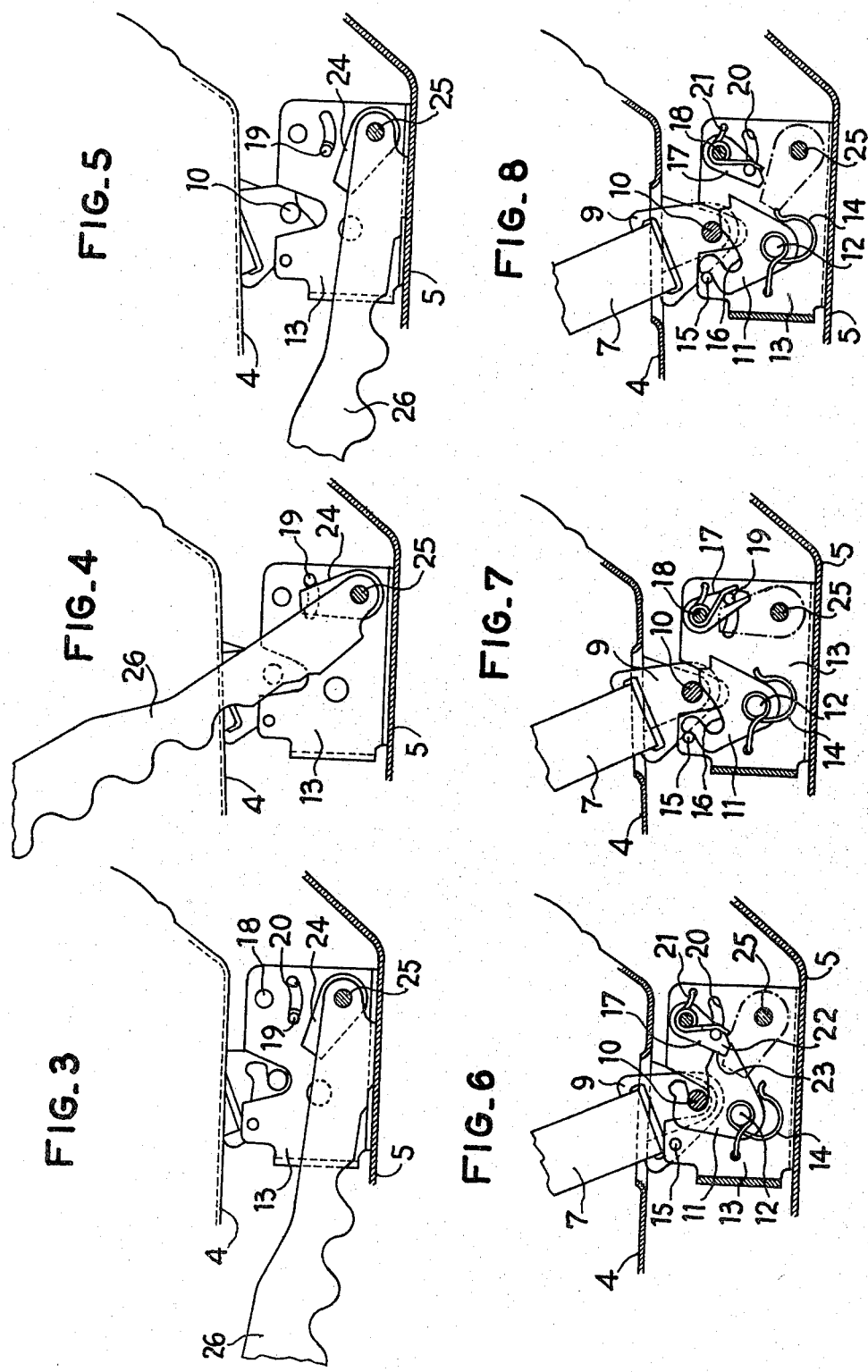

CONVERTIBLE AUTOMOBILE SEAT STRUCTURE PROVIDED WITH A SAFETY BELT HOOKING DEVICE

DESCRIPTION

The invention relates to a seat structure which is convertible so as to modify the loading volume of the luggage compartment of an automobile vehicle. It is more particularly applicable to a rear seat structure comprising a seat which is mounted to pivot about a transverse axis located in the vicinity of the front part thereof, there being provided a hooking device for safety belts.

When a convertible seat structure must be provided with a safety belt for each of its places, there must be provided for each belt a hooking device which is located adjacent the rear of the seat in the vicinity of the longitudinal median plane of the vehicle. In order to avoid the necessity of excessively reinforcing the structure of the seat, it is desirable to arrange that these anchoring devices be connected to the floor of the vehicle.

It is for example possible to provide in the seat a passage for arms which are directly fixed to the floor and each comprise hooking means for a belt. This arrangement has in particular the following drawbacks: the arms and their hooking means rub against the upholstery of the seat upon each movement and result in wear of the seat. It is not easy to reinsert the arms in the passage provided in the seat when the latter is put back in its operative position.

In another design, the hooking device for the belt is movable with the seat and means are provided for connecting this hooking device to the floor of the vehicle when the seat structure is in its position of use.

The invention relates to the last-mentioned design. The object of the invention is to provide a particularly simple arrangement which guarantees that the connection between the hooking device and the floor is achieved in all circumstances as soon as the seat structure is occupied.

According to the invention there is provided a convertible vehicle seat structure comprising a seat mounted in the vicinity of the front part thereof to pivot about a transverse axis, a hooking device for safety belts fixed to the seat and means for connecting the hooking device to the floor of the vehicle.

According to the invention, said connecting means comprise a latch carried by the hooking device and co-operating with a keeper which is pivotally mounted on the floor and is driven by the latch to a position of engagement with the latch under the effect of a vertical load applied to the seat in opposition to the action of a release spring, a bolt for locking the keeper in the engaged position thereof and manual means for disengaging the bolt.

An embodiment of the invention will now be described with reference to the accompanying drawings, in which:

FIGS. 3, 4 and 5 are side views, to an enlarged scale in the direction of arrow F of FIG. 1, of the hooking device in respect of different positions thereof;

FIGS. 6, 7 and 8 are sectional views to an enlarged scale of the hooking device in respect of the positions thereof corresponding to those of FIGS. 3, 4 and 5 respectively.

Figure 1:
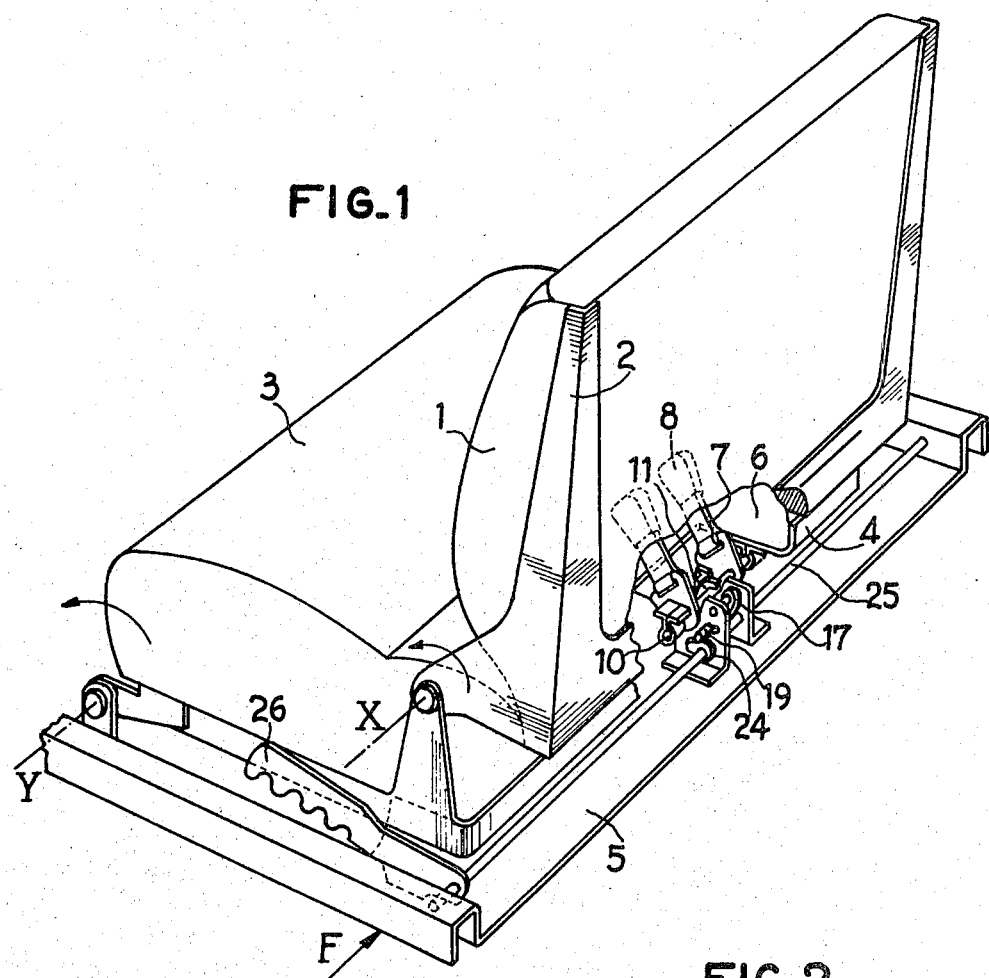
FIG. 1 is a perspective view of a seat structure provided with the hooking device arranged in accordance with the invention.
Figure 2:
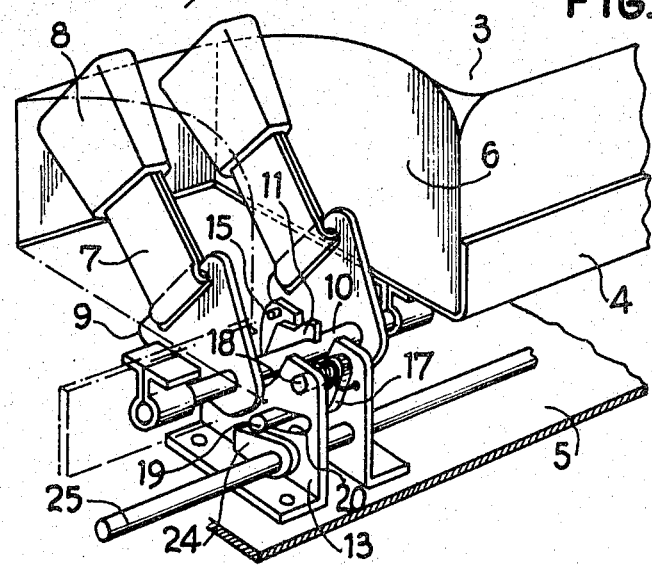
FIG. 2 is a view to an enlarged scale of a detail of the middle rear part of the seat.

FIG. 1 shows a rear automobile seat structure comprising mainly a backrest 1 provided with a reinforcement 2 and a seat 3 provided with a reinforcement 4. The backrest 1 is mounted at the base thereof on the rear of the seat 3 to pivot about a transverse axis X, whereas the seat is mounted in the front part thereof on the floor 5 of the vehicle to pivot about a transverse axis Y between a swung-down position of use of the seat as illustrated in FIG. 1 and a swung-up position.

In the vicinity of the rear middle part of the seat, a recess 6 is provided for the passage of two arms 7 each of which is provided with hooking means 8 for a safety belt (not shown). Each arm is connected to a plate 9 and the two plates are carried by a rod 10 which is rigid with the reinforcement 4 of the seat and disposed in the recess 6 transversely of the vehicle.

The rod 10 forms a latch which is adapted to cooperate with a keeper 11 which is pivotally mounted on a pin 12 disposed between the two branches of a fork 13 fixed to the floor 5.

A spring 14 biases the keeper 11 into bearing relation to a pin 15 carried by the fork. In this position, the latch 10 is released from the keeper 11 and is biased upwardly by a side 16 of the keeper which constitutes a cam.

In the same plane as the keeper 11 there is disposed a bolt 17 which is pivotally mounted on a pin 18 disposed between the branches of the fork 13. This bolt carries a pin 19 which extends through one of the branches of the fork 13 in an aperture 20. A spring 21 biases the bolt 17 in the direction in which its free end 22 engages a recess 23 of the keeper 11.

The bolt 17 may be driven in the direction for releasing the keeper 11 by an action exerted on the pin 19 by a lever 24 which is carried by a transverse rod 25 rotatably mounted relative to the floor 5 and provided at at least one of its ends with a shifting handle 26.

The arrangement just described operates in the following manner:

When the seat is correctly in position (FIGS. 3 and 6), the latch 10 is trapped between the sides of the keeper 11 and the branches of the fork 13 and the keeper 11 is locked by the bolt 17. If a pull is exerted on one or the other of the arms 7, this pull is transmitted to the floor 5 and there is no risk of the latch 10 escaping from the keeper.

In order to release the seat structure, the handle 26 is raised manually (FIGS. 4 and 7). In this movement, the lever 24, in acting on the pin 19, shifts the bolt 17 which releases the keeper 11. The latter, in being biased by the spring 14, bears against the pin 15 and its side 16 releases the latch 10 by raising it. When the handle 26 is released, the bolt 17 resumes its initial position, but the latch 10 remains released (FIGS. 5 and 8). The seat 3 can be swung around its pivotal mounting having the axis Y.

If the seat 3 is thereafter put back into its position too softly, the engagement of the latch 10 in the keeper 11 might not occur. This is the position shown in FIGS. 5 and 8. However, as soon as a passenger takes up his position on the seat 3, his weight biases the latch 10 and causes the swinging of the keeper 11 which remains locked by the bolt 17 in the position shown in FIG. 6.

Thus it can be seen that the device described guarantees that the connection between the hooking devices 7, 8 for the safety belts and the floor 5 is achieved perfectly in all circumstances.

In the described embodiment, it has been assumed that the backrest 1 was pivoted to the seat 3. It will be understood that the device described is applicable irrespective of the kinematic arrangement of the backrest.

Having now described my invention what I claim as new and desire to secure by Letters Patent is:

1. A convertible automobile vehicle seat structure in combination with a vehicle having a floor, the seat structure comprising a seat mounted in the vicinity of the front part of the seat to pivot about a transverse axis between a swung-down position for use of the seat and a swung-up withdrawn position, a hooking device for the attachment of a safety belt and connected to the seat to swing with the seat between said two positions of the seat, and connecting means for anchoring the hooking device directly to the floor of the vehicle when the seat is in said swung-down position whereby any tensile force exerted on the seat belt and hook device in said swung-down position of the seat is taken directly by the floor, said connecting means comprising a latch carried by the hooking device, a keeper pivotally mounted relative to the floor, a release spring biasing the keeper, the keeper being cooperative with the latch to be driven by the latch to a position of engagement with the latch under the effect of a substantially vertical load applied on the seat in opposition to the action of the release spring as the seat approaches said swung-down position, a bolt cooperative with the keeper for locking the keeper in its engaged position with the latch, and manual means for disengaging the bolt.

2. A seat structure as claimed in claim 1, wherein the seat has a reinforcement and the latch comprises a bar which is rigid with the reinforcement of the seat and is disposed transversely of the vehicle in a recess in the seat.

3. A seat structure as claimed in claim 2, comprising a fork member fixed to the floor and having two arms, and a pin mounted between the two arms, the keeper being pivotally mounted on the pin.

4. A seat structure as claimed in claim 3, wherein the keeper has a recess and said bolt for locking the keeper is pivotally mounted on the fork member in the same plane as the keeper, elastically yieldable means being provided for causing a free end of the bolt to engage in the recess in the keeper for locking the keeper.

5. A seat structure as claimed in claim 3 or 4, wherein said manual means for disengaging the bolt comprise an aperture defined by a branch of the fork member, a transverse rod rotatably mounted relative to the floor, a shifting handle fixed on at least one end of the rod, a pin carried by the bolt and extending through the aperture, and a lever cooperative with the pin and carried by the transverse rod.

* * * * *